United States Patent [19]

Dunnavant et al.

[11] Patent Number: 5,376,696
[45] Date of Patent: Dec. 27, 1994

[54] FOUNDRY MIXES BASED UPON RECLAIMED SAND

[75] Inventors: William R. Dunnavant, Upper Arlington; Kenneth W. Barnett, Worthington; Gary R. Hysell, Columbus, all of Ohio

[73] Assignee: Ashland Oil, Inc., Columbus

[21] Appl. No.: 2,431

[22] Filed: Jan. 8, 1993

Related U.S. Application Data

[63] Continuation-in-part of Ser. No. 952,114, Sep. 28, 1992, which is a continuation of Ser. No. 552,402, Jul. 13, 1990, abandoned.

[51] Int. Cl.$^5$ ................................ C08K 3/34
[52] U.S. Cl. ..................... 523/145; 523/146; 523/216; 524/596
[58] Field of Search ............. 523/145, 146, 216; 524/596

[56] References Cited

U.S. PATENT DOCUMENTS

| | | | |
|---|---|---|---|
| 4,055,528 | 10/1977 | Kim | 523/146 |
| 4,468,486 | 8/1984 | Matsushima | 524/146 |
| 4,568,728 | 2/1986 | Kopac et al. | 525/504 |
| 4,996,249 | 2/1991 | Johnson et al. | 523/144 |
| 5,238,976 | 8/1993 | Iyer | 523/145 |

*Primary Examiner*—Paul R. Michl
*Assistant Examiner*—John J. Guarriello

[57] ABSTRACT

The subject invention relates to foundry mixes comprised of (a) an aqueous basic solution of a phenolic resole resin; (b) a major amount of reclaimed sand which has first been treated with an aqueous non halogenated surfactant solution, and (c) a liquid ester co-reactant.

The invention also relates to foundry shapes made with the subject foundry mixes which have improved tensile strengths and scratch hardness when compared to foundry shapes which are prepared from foundry binder systems which do not utilize foundry aggregates which have been mixed with an aqueous surfactant solution.

8 Claims, No Drawings

FOUNDRY MIXES BASED UPON RECLAIMED SAND

CROSS REFERENCE TO RELATED APPLICATIONS

This application is a continuation application of PCT/US91/04751 filed Jul. 7, 1991 which designated the United States of America, which is a continuation-in-part application of U.S. application Ser. No. 07/952,114 filed on Sep. 28, 1992, which is a continuation of U.S. application Ser. No. 07/552,402 filed on Jul. 13, 1990, now abandoned.

TECHNICAL FIELD

The subject invention relates to a three component foundry binder system comprising (a) an aqueous basic solution of a phenolic resole resin; (b) an aqueous surfactant solution; and (c) an ester co-reactant.

BACKGROUND OF THE INVENTION

Aqueous basic solutions of phenolic resins are known in the art. They are used in making foundry mixes which are made into foundry shapes. The shapes are cured with an ester co-reactant by a no-bake or cold-box process depending upon whether a volatile ester is used for curing.

Although these processes have advantages from an environmental standpoint, they also have limitations. One of the primary limitations is that the tensile strengths and scratch hardness are lower than for some of the other no-bake and cold-box processes used for preparing workable foundry shapes.

Furthermore, the stability of these aqueous basic solutions of phenolic resole resins is primarily dependent upon using large quantities of base, particularly potassium hydroxide.

The use of large quantities of potassium hydroxide makes it difficult to reclaim the sand used in making the foundry shapes. This is wasteful and creates stress to the environment.

European patent application 0 336 533 discloses that reclaimed sand derived from dismantled foundry shapes made with aqueous alkaline phenolic resole resins can be effectively used to make foundry shapes if a silane is added to the reclaimed sand prior to adding the resin and ester co-reactant. Silanes, however, are expensive and more economical methods of using reclaimed sand are needed.

SUMMARY OF THE INVENTION

The subject invention relates to a three component foundry binder comprising:

(a) an aqueous basic solution of a phenolic resole resin;

(b) an aqueous surfactant solution wherein said surfactant; and (c) an ester co-reactant.

The subject invention also relates to foundry mixes prepared with the foundry binder system wherein the reclaimed sand is mixed with the aqueous surfactant solution before the resin component and ester co-reactant are added to the reclaimed sand. It additionally relates to a process for preparing workable foundry shapes and the shapes prepared thereby with the foundry mixes, a process for preparing metal castings with the workable foundry shapes, and the castings prepared thereby.

A foundry mix is prepared by mixing component (b) with certain reclaimed sand, and then adding component (a) and component (c) to the mixture of reclaimed sand and aqueous surfactant solution. Preferably the system is used for a no-bake process for making foundry shapes and component (c) is mixed with reclaimed sand which has been treated with component (b). Component (a) is then added and the mix is shaped and allowed to cure.

The advantage of this system is that pre-coating the aggregate with the aqueous surfactant solution enables the more effective use of reclaimed sand which reduces waste and stress to the environment.

The subject foundry binder systems produce foundry shapes with improved tensile strengths and scratch hardness when compared to foundry shapes which are prepared from foundry binder systems which do not utilize reclaimed sand that has been mixed with an aqueous surfactant solution.

BEST MODE AND OTHER MODES FOR CARRYING OUT THE INVENTION

The aqueous basic solutions of phenolic resole resins used in the subject binder compositions are prepared by methods well known in the foundry art. The general procedure involves reacting an excess of an aldehyde with a phenolic compound in the presence of a basic catalyst at temperatures of about 50° C. to 120° C. to prepare a phenolic resole resin. Generally the reaction will also be carried out in the presence of water. The resulting phenolic resole resin is diluted with a base and/or water so that an aqueous basic solution of the phenolic resole resin results having the following characteristics:

1. a viscosity of less than about 850 centipoise, preferably less than about 450 centipoise at 25° C. as measured with a Brookfield viscometer, spindle number 3 at number 12 setting;

2. a solids content of 35 percent by weight to 75 percent by weight, preferably 50 percent by weight to 60 percent by weight, based upon the total weight of the aqueous basic solution, as measured by a weight loss method by diluting 0.5 gram of aqueous resole solution with one milliliter of methanol and then heating on a hotplate at 150° C. for 15 minutes; and 3. an equivalent ratio of base to phenol of from 0.2:1.0 to 1.1:1.0, preferably from 0.3:1.0 to 0.95:1.0.

It has been found that aqueous basic solutions having viscosities outside the cited range are difficult to use in foundry applications. Aqueous basic solutions with a solids content below the cited range will not sufficiently coat the aggregate while those having a solids content above the cited range will not be sufficiently flowable in the molding equipment. The equivalent ratio specified for the base relates to the need for having solutions which have adequate shelf stability.

Although these ranges have been specified, it should be pointed out that it is not claimed that these aqueous basic solutions are novel products, or that the ranges are critical. The ranges are set forth to provide guidelines for those who want to make and use the invention. Obviously, the invention will usually be practiced more effectively in the preferred ranges specified. With this in mind, more specific procedures will be set forth for preparing phenolic resole resins.

The phenolic compounds used to prepare the phenolic resole resins can be represented by the following structural formula:

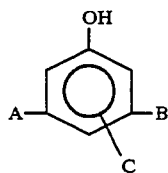

wherein A, B, and C are hydrogen, or hydrocarbon radicals or halogen.

The aldehyde used in preparing the phenolic resole resin may also vary widely. Suitable aldehydes include aldehydes such as formaldehyde, acetaldehyde, propionaldehyde, furfuraldehyde, and benzaldehyde. In general, the aldehydes used have the formula RCHO, where R is a hydrogen or a hydrocarbon radical of 1 to 8 carbon atoms. The most preferred aldehyde is formaldehyde.

The basic catalysts used in preparing the phenolic resole resin include basic catalysts such as alkali or alkaline earth hydroxides, and organic amines. The amount of catalyst used will vary depending upon the specific purposes. Those skilled in the art are familiar with the levels needed.

It is possible to add compounds such as lignin and urea when preparing the phenol-formaldehyde resole resins as long as the amount is such that it will not detract from achieving the desired properties of the aqueous basic solutions. Urea is added as a scavenger to react with unreacted formaldehyde and decrease the odor caused by it.

The phenolic resole resins used in the practice of this invention are generally made from phenol and formaldehyde at a mole ratio of formaldehyde to phenol in the range of from about 1.1:1.0 to about 3.0:1.0. The most preferred mole ratio of formaldehyde to phenol is a mole ratio in the range of from about 1.4:1.0 to about 2.2:1.0.

As was mentioned previously, the phenolic resole resin is either formed in the aqueous basic solution, or it is diluted with an aqueous basic solution. The base used in the aqueous basic solution is usually an alkali or alkaline earth metal hydroxide such as potassium hydroxide, sodium hydroxide, calcium hydroxide, or barium hydroxide, preferably potassium hydroxide.

It should again be mentioned that the aqueous basic solutions described herein are not novel products, nor is their method of preparation. The parameters set forth pertaining to their preparations are merely guidelines for those who want to make the aqueous basic solutions. There may be other effective ways to make them which are not described herein.

The aqueous surfactant solutions are solutions of water and a surfactant. The surfactant of the aqueous surfactant solution is preferably a non fluorinated surfactant, most preferably a non halogenated surfactant. The aqueous surfactant solution is added to the reclaimed sand to provide improved tensile strength and/or scratch hardness of the foundry shapes prepared with the subject foundry binder systems.

Generally, the amount of water used with the surfactant is an amount effective to permit the dispersion of the surfactant solution onto the sand, but not so much that the water in the aqueous surfactant solution causes the formation of foundry shapes which are unworkable. Generally the weight ratio of water to surfactant is from 50:1 to 1:20, preferably from 20:1 to 5:1.

Useful surfactants which can be used to form the aqueous surfactant solution include anionic, cationic, nonionic, and amphoteric surfactants. Preferably the surfactant is a non fluorinated surfactant, most preferably a non halogenated surfactant. Specific examples of such surfactants include: DOWFAX 8390 anionic surfactant, TRITON CF-76 nonionic surfactant, and MICRO Liquid Laboratory Cleaner which is a mixture of anionic, cationic, and nonionic surfactants.

The aqueous surfactant solutions are used in amount effective to improve the tensile strengths and or scratch hardness of the foundry shapes prepared with the foundry binder systems. In general such amounts are from 0.1 to 2.0 weight percent based upon the weight percent of the reclaimed sand, preferably from 0.1 to 0.9 weight percent. The addition of excessive amounts of the aqueous surfactant solution will not provide improved performance of the binder system.

The ester co-reactants used in the subject foundry binder system are well known in the art. For instance, see U.S. Pat. Nos. 4,474,904 and 4,468,359. The specific ester co-reactant which is used in the foundry binder systems will depend upon the specific application. If foundry shapes are to be prepared by the no-bake process, then low molecular weight lactones, organic carbonates, carboxylic acid esters and mixtures thereof may be used as the ester co-reactant.

If the foundry shapes are prepared by a cold-box process, the ester co-reactant used is a volatile ester such as a $C_1$–$C_4$ alkyl formate. Particularly useful as a volatile ester co-reactant is methyl formate.

The amounts and methods for using the specific ester co-reactants are also known in the art and need no further elaboration. However, when foundry shapes are prepared by a no-bake process, generally from ten to thirty weight percent of liquid ester co-reactant is used, said weight percent based upon the weight of the binder.

If foundry shapes are prepared by the no-bake process, component (c), which is a liquid ester in a no-bake application, is preferably combined with the mixture of reclaimed sand and aqueous surfactant solution before component (a) is added. If foundry shapes are prepared by the cold-box process, then component (a) is combined with the mixture of reclaimed sand and aqueous surfactant solution before exposing the shape to the volatile ester.

Foundry mixes are prepared by combining the resin component with the reclaimed foundry sand which has been coated with an effective amount of the aqueous surfactant solution.

The aggregate used to prepare the foundry mixture is reclaimed sand obtained by the dismantling foundry shapes which contain a cured binder derived from an ester cured alkaline phenolic resin. Generally the reclaimed sand will be sand which contains at least 70 percent by weight silica. Other suitable sand includes zircon, olivine, alumina-silicate sand, chromite sand, and the like. Generally, the particle size of the sand is such that at least 80 percent by weight of the sand has an average particle size between 50 and 150 mesh (Tyler Screen Mesh). The reclaimed sand can be mixed with new sand that is typically used in the foundry industry for such purposes. Preferably the new sand will be from 0 to 20 weight percent based upon the total weight of the sand.

In making foundry shapes, the aggregate constitutes the major (more than 50 percent by weight of the total weight of the foundry shape) constituent and the binder system constitutes a relatively minor amount. The amount of binder system is generally no greater than about ten percent by weight and frequently within the range of about 0.5 to about 7 percent by weight based upon the weight of the aggregate. Most often, the binder content ranges from 0.6 to about 5.0 percent by weight based upon the weight of the aggregate in most foundry shapes.

Workable foundry shapes are prepared with the foundry mixes by introducing them into a corebox, pattern mold, or other shaping device according to techniques well known in the art. A workable foundry shape is one which can be handled without breaking when it leaves the corebox or pattern mold. Curing is carried out according to techniques well known in the art.

Metal castings are produced from the workable foundry shapes in a conventional manner. Essentially, molten metal (ferrous or non-ferrous) is poured into and around the workable foundry shape and allowed to harden. The workable foundry shape is then removed.

In the Examples, the aqueous basic solution of a phenolic resole resin (hereinafter referred to as the resin component) used was NOVASET® 735 binder which is a phenol-formaldehyde base catalyzed resole condensate prepared by reacting phenol, paraformaldehyde, water in the presence of dilute alkali hydroxide bases at elevated temperatures. The resin component has a 53 percent solids content and a viscosity of about 157 centipoise at 25° C., and a molar ratio of base to phenol of about 0.80, a formaldehyde to phenol molar ratio of about 1.80, and a water to phenol molar ratio of about 6.77.

The examples which follow will illustrate specific embodiments of the invention. They are not intended to imply that the invention is limited to these embodiments.

In the Examples the following abbreviations will be used:

DOWFAX 8930=an aqueous anionic surfactant solution sold by Dow Chemical comprised of disodium hexadecyldiphenyloxide disulfonate, disodium dihexadecyldiphenyloxide disulfonate, water, sodium sulfate, sodium chloride, and methylene chloride.

TRITON CF 76=an aqueous nonionic surfactant solution sold by Rohm & Haas comprising phenoxy-capped polyoxyethylene.

MICRO Liquid Laboratory Cleaner=an aqueous surfactant solution sold by International Products Corporation comprising cationic surfactants containing sodium, ammonium and triethanolammonium cations; anionic surfactants containing ethylenediamine tetraacetate, linear alkyl aryl sulfonates; and nonionic surfactants including polyethoxynonylphenol.

EXAMPLES

Foundry mixes were prepared with various binder systems by mixing 0.2 (Examples 2-3) or 0.4 (Example 1) weight percent, based upon the weight of sand, of the aqueous surfactant solution with reclaimed sand which is silica sand obtained from foundry shapes which contain a cured binder derived from an ester cured alkaline phenolic resin.

Then 25 weight percent of glyceryl triacetate (the ester co-reactant) was added to the mixture of the reclaimed sand and aqueous surfactant solution, said weight percent based upon the resin component used which is from 1.3 (Example 1) to 1.4 (Examples 2-3) weight percent based upon the weight of the sand. The resin component is mixed with the mixture of reclaimed sand, aqueous surfactant solution, and ester co-reactant to form the foundry mix.

The foundry mix comprising all of the components of the binder system and the reclaimed sand was forced into a standard AFS core box (dog bone shape) by air blowing. Tensile strengths (in psi) and scratch hardness (measured from 1–100 with 100 being the hardest) of the cured samples were then measured by conventional methods. Scratch hardness was measured by AFS test 318-87-S, as described in "Mold & Core Test Handbook, second edition, Core Tester 674, 1 hour, 3 hours, and 24 hours after curing. The tensile strength and scratch hardness were also measured on samples 24 hours after curing which had then been aged for 1 hour at a relative humidity of 100%.

In all of these examples the same components and amounts (described previously) were used unless otherwise specified. Table I shows the specific aqueous surfactant solutions were used in the binder systems. The data in TABLE I indicate that the addition of the aqueous surfactant solution to the reclaimed sand results in better tensile strengths and scratch hardness for the foundry shapes.

TABLE 1

(Tensile Strengths and Scratch Hardness of Foundry Shapes Cured by a No-bake Process)

| | | Tensile (psi)/Scratch Hardness | | | |
|---|---|---|---|---|---|
| Example | Surfactant | 1 hr | 3 hr | 24 hr | 24 hr + 1 100RH |
| Control A | None | 17/20 | 30/34 | 51/48 | 40/38 |
| 1 | TRITON | 23/28 | 43/31 | 62/54 | 56/44 |
| Control B | None | 17/29 | 30/31 | 40/42 | 32/30 |
| 2 | DOWFAX | 24/26 | 46/43 | 57/53 | 46/42 |
| 3 | MICRO C.S. | 29/35 | 37/52 | 67/61 | 50/47 |

We claim:

1. A foundry mix comprising in admixture:
   (a) an aqueous basic solution of a phenolic resole resin;
   (b) reclaimed sand,
      (i) in a major amount relative to the combined weight of the non halogenated surfactant solution, phenolic resole resin, and ester co-reactant,
      (ii) which has first been treated with an aqueous non halogenated surfactant solution in an amount effective to increase the tensile strength of foundry shapes made with said foundry mix, such that the weight ratio of surfactant to water in said aqueous non halogenated surfactant solution is from 50:1 to 5:1, and
   (c) a liquid ester co-reactant,
such that the weight ratio of weight ratio of ester co-reactant to phenolic resole resin is from 0.1:1.0 to 0.3:1.0.

2. The foundry mix of claim 1 wherein the reclaimed sand is obtained from dismantled foundry shapes which contain a cured binder derived from an ester cured alkaline phenolic resin.

3. The foundry mix of claim 2 wherein the surfactant used in the aqueous surfactant solution is selected from the group consisting of anionic, cationic, and nonionic surfactants.

4. The foundry mix of claim 3 wherein the percent by weight of binder, which includes the non halogenated surfactant solution, phenolic resole resin, and ester co-reactant, is from 0.5 percent by weight to 7.0 percent wherein said percent by weight is based upon the weight of the foundry mix.

5. The foundry mix of claim 4 wherein the weight ratio of water to surfactant in the aqueous surfactant solution is from 20:1 to 5:1.

6. The foundry mix claim 5 wherein the amount or aqueous non halogenated surfactant solution is from 0.1 to 2.0 weight percent based upon the weight percent of the reclaimed sand.

7. The foundry mix claim 6 wherein the surfactant used in the aqueous surfactant solution is a mixture of anionic, cationic, and nonionic surfactants.

8. The foundry mix of claim 7 wherein the reclaimed sand will contain from 0 weight percent to 20 weight percent of new sand wherein said weight percent is based upon the total weight of sand.

* * * * *